No. 889,415. PATENTED JUNE 2, 1908.
F. E. VANDERCOOK.
CHAIN MACHINE.
APPLICATION FILED APR. 28, 1903.

Witnesses
William V. Devitt
Edward K. Nicholson

Inventor
Frank E. Vandercook
By
Chamberlain & Newman
Attorneys

No. 889,415. PATENTED JUNE 2, 1908.
F. E. VANDERCOOK.
CHAIN MACHINE.
APPLICATION FILED APR. 28, 1903.

Witnesses
William R. Devitt
Edward K. Nicholson

Inventor
Frank E. Vandercook
By Chamberlain & Newman
Attorneys

No. 889,415. PATENTED JUNE 2, 1908.
F. E. VANDERCOOK.
CHAIN MACHINE.
APPLICATION FILED APR. 28, 1903.

Witnesses
William P. Devitt
Edward K. Nicholson

Inventor
Frank E. Vandercook,
By Chamberlain & Newman
Attorneys

No. 889,415. PATENTED JUNE 2, 1908.
F. E. VANDERCOOK.
CHAIN MACHINE.
APPLICATION FILED APR. 28, 1903.

Witnesses
William V. Devitt
Edward K. Nicholson

Inventor
Frank E. Vandercook
By Chamberlain & Newman
Attorneys

UNITED STATES PATENT OFFICE.

FRANK E. VANDERCOOK, OF WATERBURY, CONNECTICUT.

CHAIN-MACHINE.

No. 889,415.            Specification of Letters Patent.         Patented June 2, 1908.

Application filed April 28, 1903. Serial No. 154,647.

*To all whom it may concern:*

Be it known that I, FRANK E. VANDERCOOK, a citizen of the United States, and resident of Waterbury, in the county of New Haven and State of Connecticut, have invented certain new and useful Improvements in Chain-Machines, of which the following is a specification.

My invention relates to a new and useful improvement in sheet metal chain machines which is designed to produce an improved form of sheet metal chain from a continuous strip of metal.

It is the object of my invention to provide an automatic machine which is especially adapted to manufacture a sheet metal chain of special construction from a single narrow strip of sheet metal, of a width corresponding to that of the width of the eye portion of the completed chain.

The special construction of chain made on my machine is one formed from sheet metal comprising a folded link bearing an eye through its flat end and a reinforced loop portion to strengthen the same. Said reinforcement being produced by turning or folding in the side edges of the blank intermediate of the eyes in a way to thicken the shank or loop portion to the folding of the link. It is further true that while this machine is designed to make the particular style of reinforced chain referred to, yet it is equally applicable and can readily be adapted to make the common style of sheet metal chain, and more rapidly than is now done.

With the above objects in view my invention resides and consists in the novel construction and arrangement of parts shown upon the accompanying seven sheets of drawing forming a part of this specification, upon which similar letters and characters of reference denote like or corresponding parts throughout the several figures and of which, Fig. 5 is a similar cross section taken a little to the right of the previous section on line 5—5 of Fig. 3, illustrating the mechanism for the initial folds on the opposite intermediate edges of the link blank, as will again be referred to. Fig. 6 shows a perspective view of the punch and die block shown in the preceding Fig. 5, by means of which this initial folding of the link blank is effected. Figs. 10 to 14 inclusive illustrate blanks in the course of formation, all of which will again be referred to.

Figure 12:
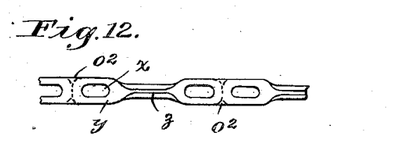
Figure 13:
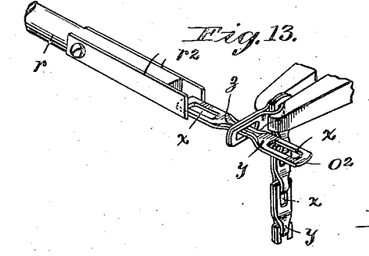

As before stated, my machine is designed to automatically form a special sheet metal chain from a single narrow strip of metal with substantially five operations, four of which are performed by punches, and the fifth by folding mechanism. The movement of the metal through the machine is from left to right. It first passes through a straightening device illustrated in Figs. 1 and 3. From thence the metal passes over the initial die block where a pair of elongated holes or eyes are stamped through the central line of the strip by the first pair of punches seen in Fig. 9. The next operation upon the strip is on the adjoining die block where the outer edges intermediate of the holes referred to are disposed upward by a pair of folders operating through the die block, deflecting the intermediate portion of the edge of the metal upward on either side of the retaining punch carried by the gate. Upon the adjoining or third die block this upwardly deflected metal is turned in and down upon the narrow or loop portion of the blank as shown in Fig. 12, by a punch of suitable formation, in a manner to reinforce the same at that point. After the intermediate portion of the blank has been turned over and reinforced as stated, the said blank is severed from the strip on the fourth die block and by the cutter punch shown on the left in Fig. 9. The blank feeding mechanism referred to, and shown in Figs. 3 and 15 engages the rear hole in the blank, feeds it forward through the eye of the previously formed link, as shown in Fig. 13. The blank is righted, or next turned from the horizontal position, shown in Fig. 13, to the vertical position shown in Fig. 14 by the mechanism illustrated in Figs. 3 and 13. With the blank in this position the closing jaws come forward and folds the link around the previously formed link and the post shown in Figs. 3, 9 and 14. Said jaws support the closed link until the post is drawn down out of the loop of the link, whereupon the same is carried back in the jaws and retained, as shown in Fig. 13, until the next link is threaded through its eye and turned to the position shown in Fig. 14. With this initial description of the operation of the machine, I will proceed to describe the parts in detail, reference being had to letters and characters of reference marked upon the several figures of the drawings.

Figure 1:
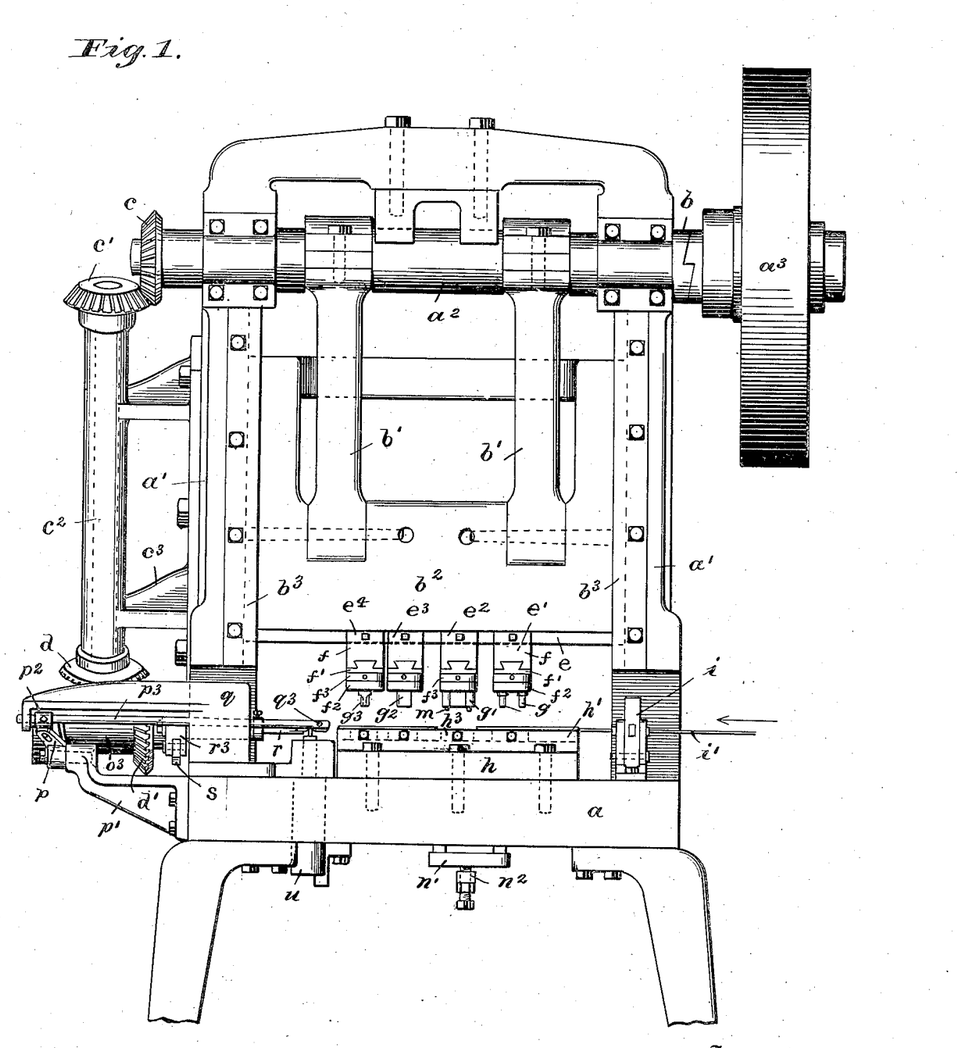
Figure 1 shows a front elevation of my novel machine complete, the legs of the bed of the press, however, being broken away.
Figure 2:
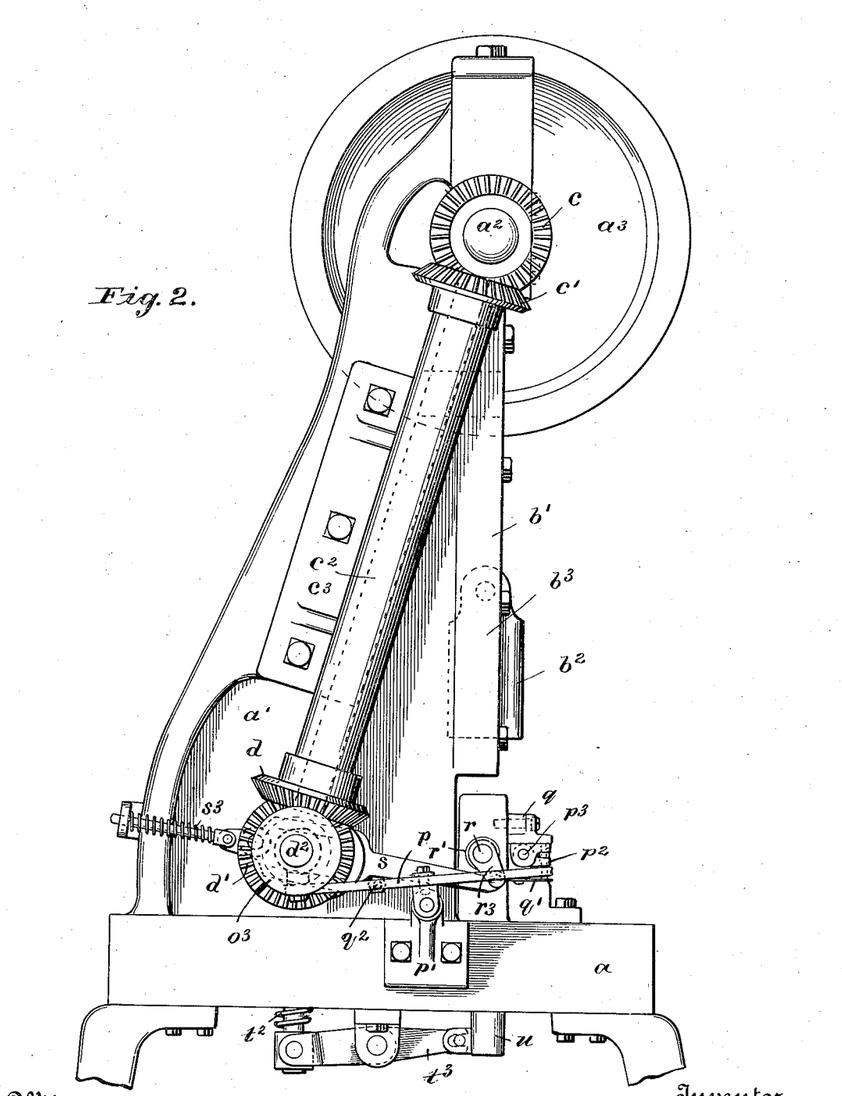
Fig. 2 is an enlarged side view of the machine as seen from the left of Fig. 1.

Referring to the characters of reference marked upon the drawings, and first to Figs. 1 and 2, it will be seen that my machine is designed somewhat on the press principle, consisting of a bed $a$ mounted upon legs and carrying a suitable frame $a'$. Within the vertically disposed side portions of this frame is mounted a driving shaft $a^2$ bearing a driving pulley $a^3$. This pulley and shaft may be provided with any suitable clutch mechanism $b$ for starting and stopping the machine.

$b'$—$b'$ represent connecting links, the upper ends of which are attached to eccentrics on the driving shaft $a^2$ while the lower ends are likewise pivotally connected to the vertically reciprocating gate $b^2$, the latter being mounted in suitable ways $b^3$ in the frame of the press $b$. Thus it will be seen that with each rotation of the shaft the gate is raised and lowered a proper distance to insure the desired operation of the punches carried thereby.

Upon the end of the driving shaft is a bevel gear $c$ which meshes with and drives a similar bevel gear $c'$ on an angularly disposed shaft $c^2$ mounted in a bracket $c^3$ secured to the side of the frame of the press. On the opposite or lower end of this shaft is a third bevel gear $d$ meshing with and driving a similar bevel gear $d'$ on a horizontal shaft $d^2$ journaled in bearings $d^3$ secured to the frame of the machine. This shaft is what I will term the cam shaft since it carries six cams for operating the several parts of the machine. Some of these cams are double-acting cams, as will later be more particularly described.

Upon the under face of the gate is secured a dovetail way $e$ (see Figs. 5 and 9) upon which the tool-carrying heads $e^1$, $e^2$, $e^3$ and $e^4$ are adjustably attached. The construction of these heads is the same in each instance, and consists of a block $f$ having a dovetail recess across its top face to engage longitudinal way $e$ of the gate, before mentioned, and a similar dovetail across its under face at a right angle to the one on top. This under dovetail receives a correspondingly shaped way on the top side of a nipple $f'$. Within this nipple is a central bore to receive the tool holder $f^2$, and a nut $f^3$ is attached to the threaded periphery of the nipple in a manner to form a shoulder for the flange of the tool holder. The tools carried by these heads necessarily differ slightly, the first head $e'$ being provided with a pair of plain punches $g$—$g$, the faces of which are elongated to produce elongated holes or eyes $x$ in the blank $y$. The head $e^2$ carries a former $g'$, as clearly appears in Figs. 5, 6 and 9, which is brought down on the blank holding it in place while the folders turn the edges of the stock against the opposite side thereof. The tool $g^2$ carried in the head $e^3$ serves to close the upwardly disposed edges of the blank down upon the narrow portion of the blank, while the punch $g^3$ cuts the blank from the strip.

Upon the bed $a$ of the machine is a die bed $h$ which is provided with a central longitudinal dovetail $h'$ to receive the die blocks $h^2$, $h^3$, $h^4$ and $h^5$, all of which are adjustable in said slot but held in place by suitable set screws. It will thus be apparent that these die blocks, as well as the tool carrying heads are both adjustable lengthwise as well as removable, adapting the machine to produce chains of different sizes which of course would necessarily require the substitution of different size tools and die blocks.

$i$ represents a straightener through which the metal strip $i'$ passes to the tools of the machine. The said strip is guided under lontudinal plates $i^2$—$i^2$ and $i^3$—$i^3$ secured to the die bed, (see Figs. 3 4 and 9) and over the center of the respective die blocks. This strip is fed forward a given distance at predetermined intervals by mechanism shown in Figs. 3 and 4, which I will next refer to.

To the die bed $h$ is secured a bracket $j$ having a longitudinal way through its top side to receive a slide $j'$. This slide has hinged to it an arm $j^2$ carrying a finger $j^3$. A pin $k$ is secured to the slide, passes up through the arm and likewise through the free end of the lever $k'$ pivoted to a stud $k^2$ attached to the bed. The rear end of the arm carries a stud and roll $k^3$ which is engaged by the cam $l$ on the cam shaft. The cam in question is provided with both a horizontal and vertical cam face to engage the stud and roll respectively of the arm in a manner to operate the same both forward and backward and in and out against the action of the springs $l'$ and $l^2$. The rise and fall movement of the lever lowers and raises the finger to engage and disengage the strip, while the forward and backward throw of the lever is to draw the strip in predetermined distances, with each turn of the shaft, as is obviously necessary to insure the proper feeding of the machine.

The first die block $h^2$ is provided with a pair of holes to receive the punches $g$ whereby the two initial holes or eyes are produced in the strip, the scrap from said strip passing down through openings of the die block and bed.

Figures 5, 6:
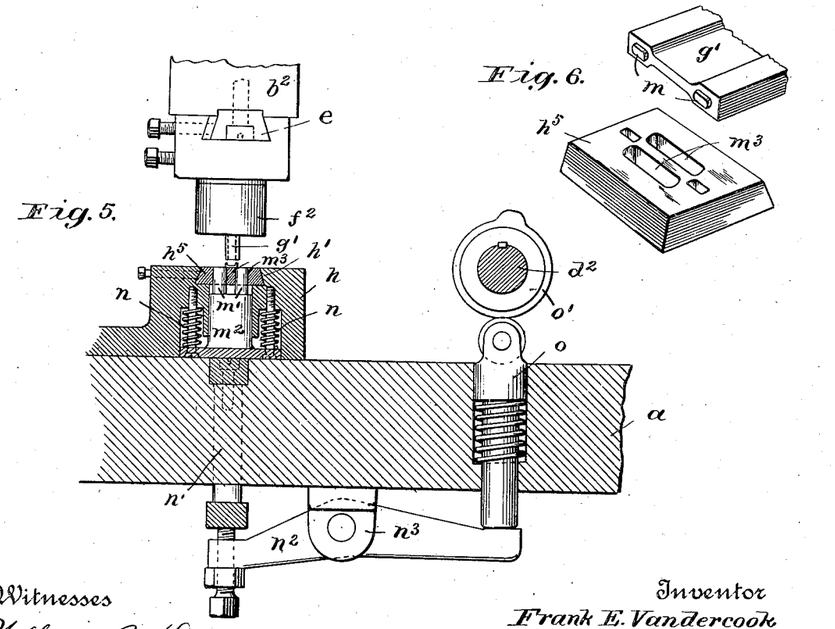
Figure 9:
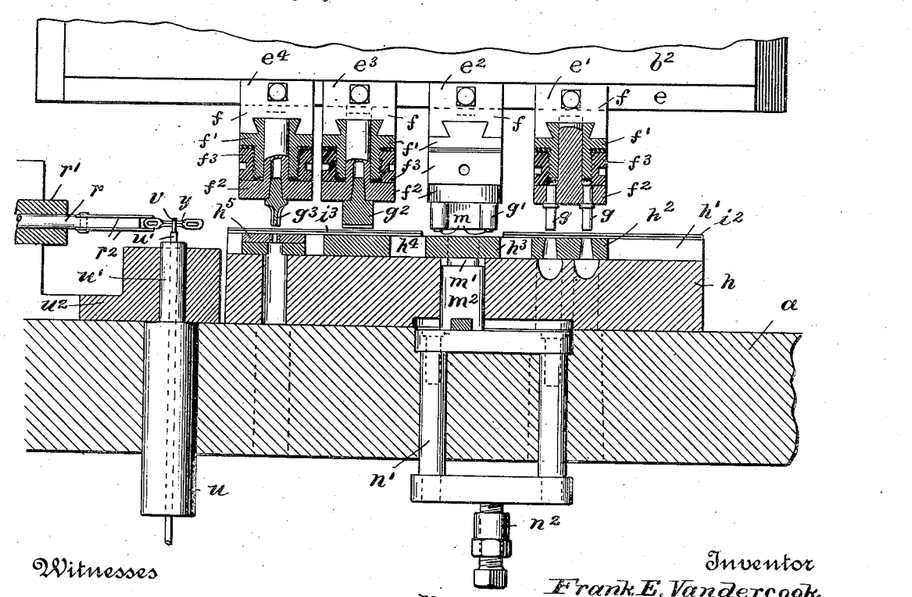
Fig. 9 shows an enlarged longitudinal sectional view through the press bed, die bed, die blocks and punches, the latter being slightly raised from the blocks and the whole clearly illustrating the several stations at which the different operations are performed.
Figure 10:
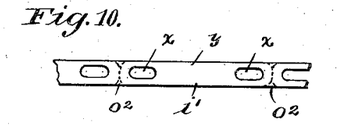
Figure 11:
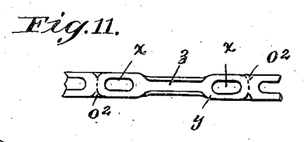

The second operation of deflecting the intermediate side edges of the blank upward, is performed by the tools shown in Figs. 5, 6 and 9, consisting in the first instance of the tool $g'$ having the teats $m$ on its under face, which in practice engage the elongated holes in the blank to firmly retain the same in position while the two folders $m'$ secured to the plunger $m^2$ move upward through the orifices $m^3$ in the die block $h^3$ in a way to engage the edges of the blank and fold it in against the recessed side of the face of the tool $g'$. The plunger $m^2$ is provided with a lower cross piece and springs $n$ to normally hold the same down against the press bed, and to bring the folders $m'$ flush with the face of the die block. The vertically movable gate $n'$ mounted in the bed $a'$, engages the underside of this plunger to raise and lower the same, said gate being operated by a lever $n^2$ pivoted to a bracket $n^3$ secured to the bed. The rear end of the lever is engaged by a spring actuated pin $o$ bearing a roll to engage the cam $o'$ on the cam shaft $d^2$. From the construction just described it will be apparent that with each rotation of the cam shaft, the pin $o$, lever $n^2$, gate $n'$, the plunger and tools are operated with the gate of the machine in a manner to deflect or fold the intervening edges of the blank upward.

Figure 14:
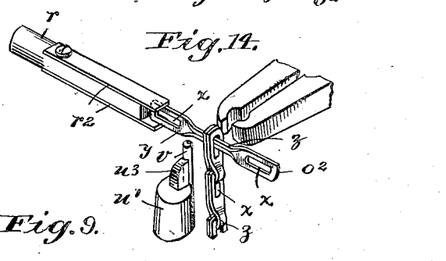
Figure 15:
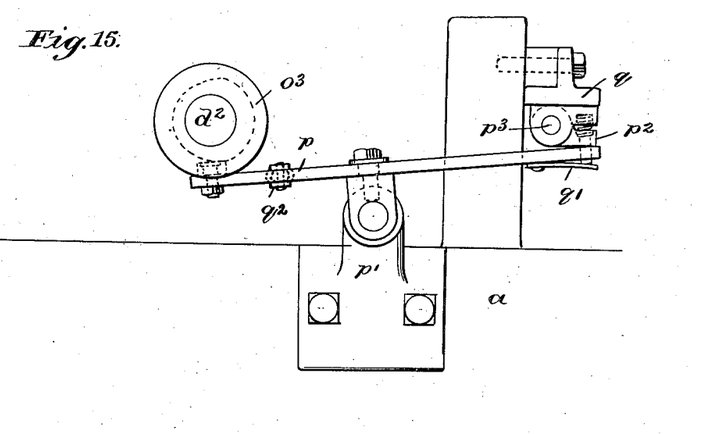
Fig. 15 is a detailed side elevation of the mechanism shown in Figs. 1, 2 and 3, for feeding the completed blank forward through the eye of the previously formed link (see Fig. 13).
Figure 16:
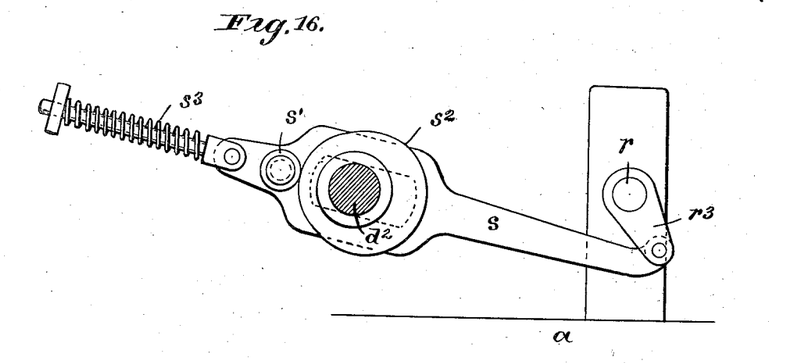
Fig. 16 is a side elevation of a part of the mechanism shown in Figs. 1, 2 and 3, for turning the blank from a horizontal to a vertical position.

The next operation is that of folding said bent edges of the blank down upon the narrow portion of the blank, intermediate of the holes, to reinforce the loop portion $z$. This is done by the tool $g^2$ which is provided with a plain oval longitudinal recess to engage the edges of the blank and fold them in upon the neck of the blank, pressing the same down upon the die block $h^4$ of the die bed. The blank is again drawn forward past the severing punch $g^3$ which is forced through the strip as at $o^2$, removing therefrom a small bit of scrap which is forced down through the die block and die bed, thus freeing the blank from the strip, but still retaining it in the ways for the die blocks. From the above position the open link is fed forward and threaded through the previously folded link by the following mechanism. Upon the extended end of the cam shaft $d^2$ is a double faced cam $o^3$ (see Figs. 3 and 15) which engages the stud and roll of a lever $p$ swivelly attached to a bracket $p'$ secured to the frame of the machine while the forward end of said lever is pivotedly connected to an arm $p^2$ attached to a reciprocating rocker rod $p^3$ secured in suitable bearings of a bracket $q$. Springs $q'$ serve to normally hold the forward end of the lever down and the rear end in engagement with the peripheral face of the cam $o^3$, before mentioned, while the spring $q^2$ likewise serves to normally hold the roll of the lever in engagement with the vertical face of said cam $o^3$. The free end of the rocker rod is provided with a finger $q^3$ which acts similar to the finger $j^3$ before mentioned, serving to engage the rear hole in the link and shoving the same forward with the forward reciprocating movement of the rod and which is actuated through the lever $p$ by the cam $o^3$. The movement of this rod is, of course, just sufficient to move the open link forward into the loop of the folded link, as is clearly shown in Figs. 3 and 13. The forward end of the link is simultaneously lodged in the socket of the turner, which I will next describe. This turning mechanism is clearly shown in Figs. 3, 8, 9, and 16, and consists of a rocker rod $r$, mounted in a bushing $r'$ of the bracket $q$ before mentioned. The near end of the rod is provided on opposite sides with longitudinal spring plates $r^2$ which extend slightly beyond the rod in a manner to form a pocket into which the open link is inserted, as shown in Figs. 13 and 14. The outer end of this rod is provided with an arm $r^3$ which in turn is connected by a reciprocating link $s$ which is bifurcated to straddle the cam shaft and bears a roll $s'$ to engage the cam $s^2$ of the cam shaft by the action of a spring $s^3$, which normally forces said link and roll forward, as shown in Fig. 16. The purpose of this construction, as will be apparent is to receive, support and turn the link from a horizontal to a vertical position, and further to support the chain until the folding mechanism engages said link and forces it around the post, which operation will next be described.

Figure 3:
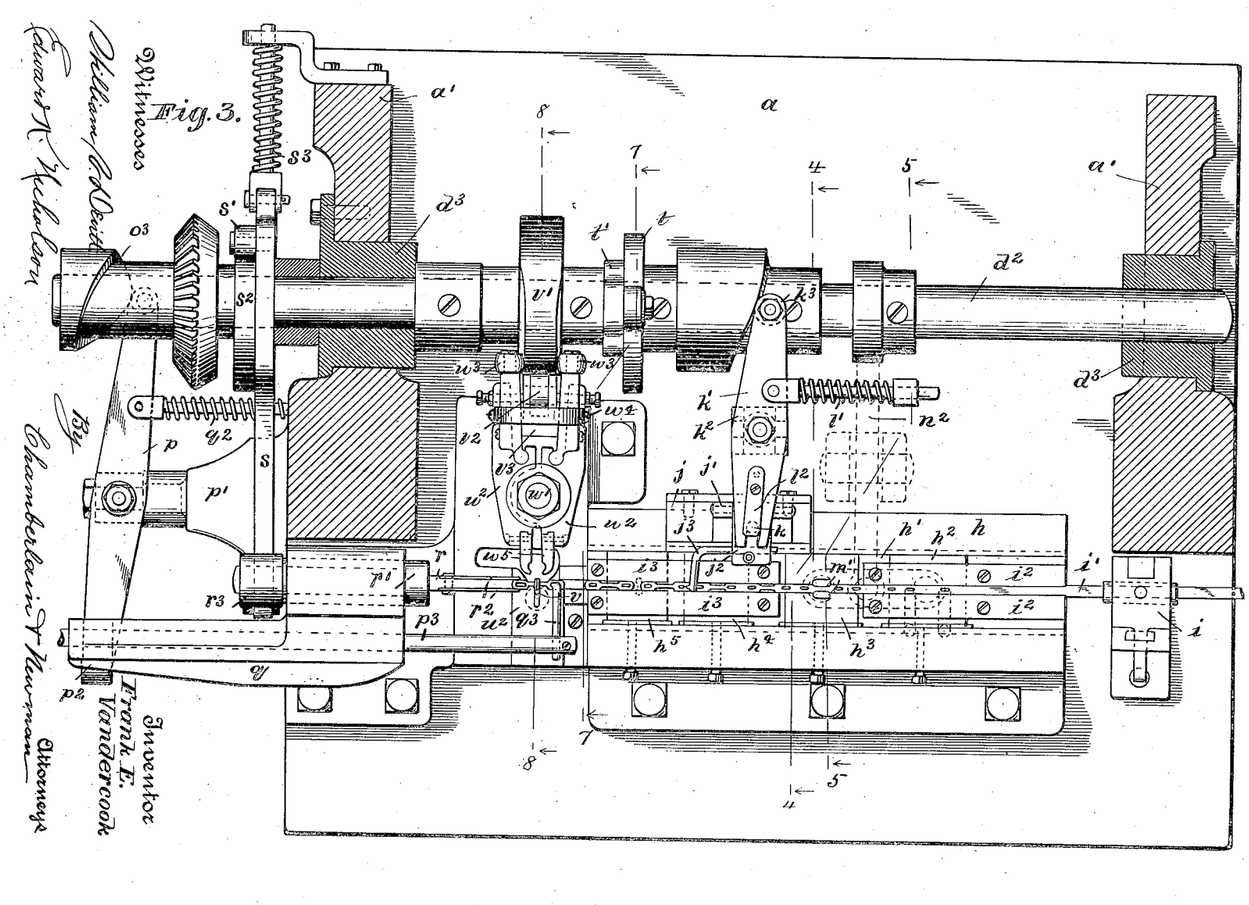
Fig. 3 is a further enlarged sectional plan view illustrating the bed of the machine, together with the cam shaft, dies, feed mechanism and folding devices.
Figure 4:
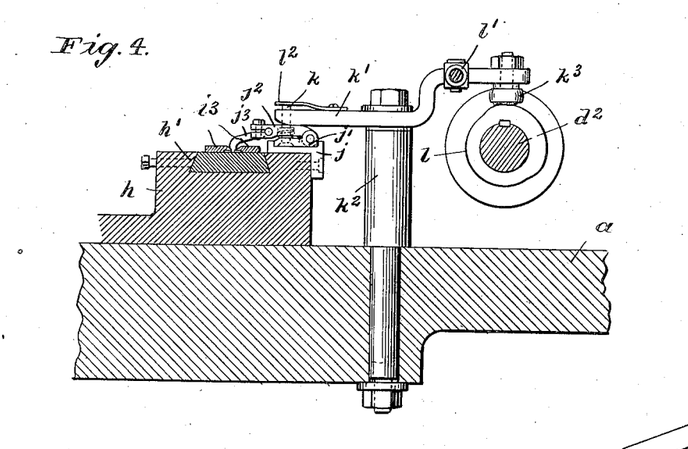
Fig. 4 is a transverse cross section taken on line 4—4 of Fig. 3, illustrating the mechanism for feeding the sheet metal strip forward under the respective punches.
Figure 7:
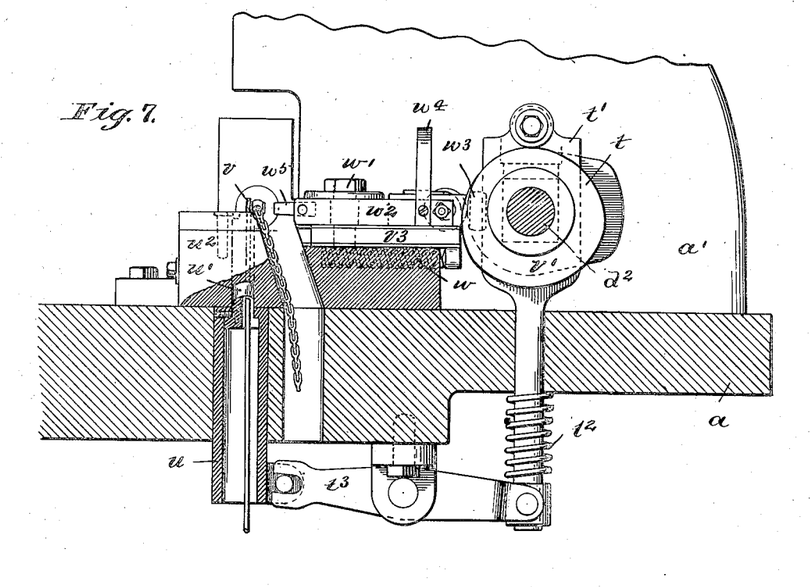
Fig. 7 is a cross section taken on line 7—7 of Fig. 3, illustrating in side elevation, the folding mechanism, including the post around which the blank is bent.
Figure 8:
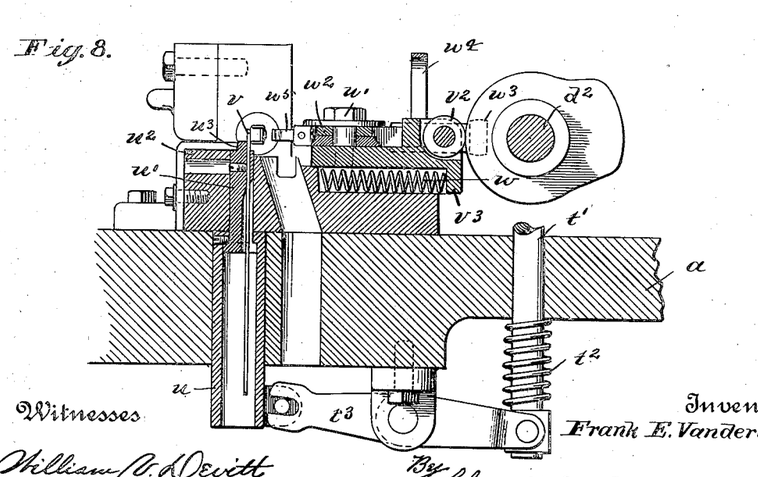
Fig. 8 is also a cross section taken on line 8—8 of Fig. 3, through the folding mechanism, more clearly illustrating the construction of the several parts thereof.

Referring to Figs. 3, 7 and 8, it will be seen that upon the cam shaft $d^2$ is a cam $t$ which engages a roll of an eccentric link $t'$, the latter being provided with a spring $t^2$ intermediate of its collar and the bed of the press, which spring normally holds the roll down upon the face of the cam. One end of the lever $t^3$ pivoted to a bracket of the bed, is engaged by the lower end of the eccentric link while the forward end of the lever engages a vertically movable tubular slide $u$ mounted in the bed of the machine. Said tube being provided with a reduced extension $u'$ which passes through a plate $u^2$ secured to the machine bed and bearing a post $u^3$ to support the extended rod $v$. This steel rod $v$ is adjustably secured in this reduced extension $u'$ and in practice projects slightly above the post mentioned and serves as the medium around which the link is folded. Each rod being adapted to be adjusted upward with the wear of the same, as is obviously necessary.

Figure 17:
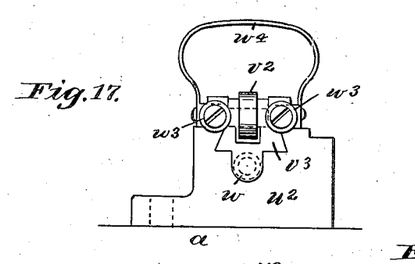
Fig. 17 is a detail rear end view of the folding mechanism shown in Figs. 3 and 7.

The reciprocating part of the folding or bending mechanism is operated from a double acting cam $v'$ mounted upon the cam shaft, the peripheral face of which engages the roll $v^2$ (see Fig. 8) secured to a slide $v^3$ (see also Fig. 17) which slide bears a dovetail way to engage a similar way in the plate $u^2$ before mentioned, and is further provided with a spring $w$ to normally hold the slide outward with its roll against the face of the cam. Upon the top of this slide and to a pivotal screw $w'$ is mounted a pair of jaws $w^2$ bearing rolls $w^3$ on their rear ends to engage the irregular shaped side faces of the cam $v'$ before mentioned.

$w^4$ represents a spring which normally tends to hold the rear end of these jaws together against the sides of the cam, as shown in Fig. 3. The forward end of these jaws are provided with hardened steel points $w^5$, each having a vertical concave recess on its inner face of substantially the shape and form of a loop of a link. The shape of the cam and construction of mechanism is such as to force the jaws forward while in an open position, as shown in Fig. 3, then to close them, bending the link around the post, next drawing them back to the rear in such folded position, and holding the link in its grasp until the successive blank has been threaded through the eye, as will be obviously necessary.

From the foregoing description it is thought that the construction of the machine will be clear and apparent to those skilled in the art, and a further detailed description of its operation is not thought to be necessary, and will therefore be omitted.

Having thus described my invention what I claim and desire to secure by Letters Patent, is:—

1. In a chain making machine, link-clamping mechanism, reciprocatory means movable in one direction for displacing the intermediate portion of the link, and reciprocatory means movable in the opposite direction for positioning the displaced stock over the said intermediate portion.

2. In a chain making machine, means for forming eyes in a link blank, clamping means embodying eye engaging members, means for coacting with the clamping device for upsetting the intermediate portion of the link, and means for juxtaposing the displaced stock over the intermediate portion of the link.

3. In a sheet metal chain machine the combination with eye forming and blank severing punches, of a tool and die block for engaging the blank, folders to engage the faces of the edge of the blank intermediate of the eyes to deflect them at an angle, and mechanism for closing in said deflected edges of the blank to reinforce the same intermediate of the said eyes.

4. In a sheet metal chain machine the combination with eye forming and blank severing dies, of a tool the face of which is of a shape and size substantially corresponding with that of the blank, and teats upon the face of said tool to engage the eyes of the blank in a way to center the same, a pair of formers to engage the intermediate side edges of the blank to throw it against the two sides of the tool and means for closing said deflected edges in and upon the main stock.

5. In a sheet metal chain machine, the combination with means for holding a link blank in its proper position, of reciprocatory means adapted to engage and deflect the edges of such blank intermediate the eye portions, and means for subsequently engaging said turned edges of the blank and bending the same over and upon the body of the blank.

6. In a sheet metal chain machine, the combination with a tool the face of which is of a shape and size substantially corresponding with that of a link blank and provided with means for centering the same, of formers to engage the intermediate side edges of the blank to deflect them against the two sides of said tool, and means for closing said deflected edges in and upon the main stock.

Signed at Waterbury in the county of New Haven and State of Connecticut this 21st day of April A. D., 1903.

FRANK E. VANDERCOOK.

Witnesses:
ROBERT A. LOWE,
WILBUR G. AUSTIN.